June 2, 1942.                J. P. BENOIT                 2,285,325
        KNIFE OPERATING MECHANISM FOR GLASS BLOWING MACHINES
                    Filed Nov. 27, 1940         5 Sheets-Sheet 1

J. P. Benoit
INVENTOR

BY Rule & Hoge
ATTORNEYS

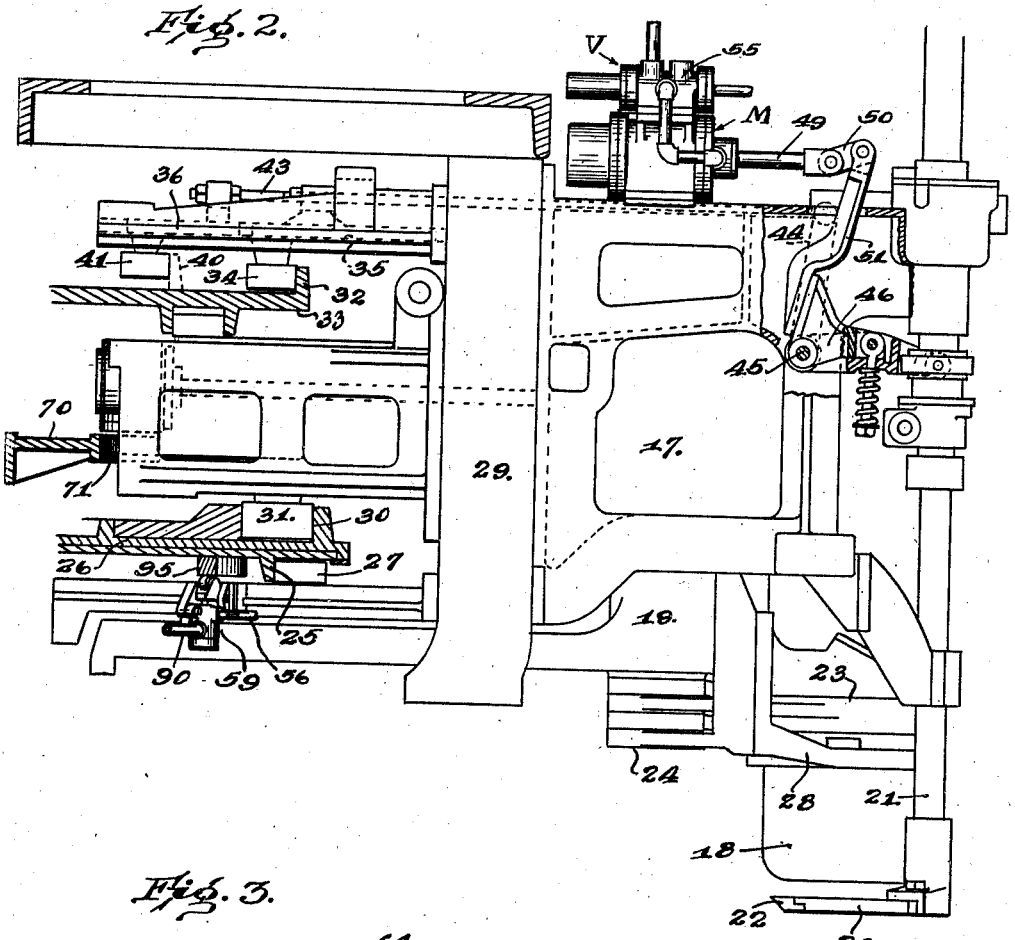
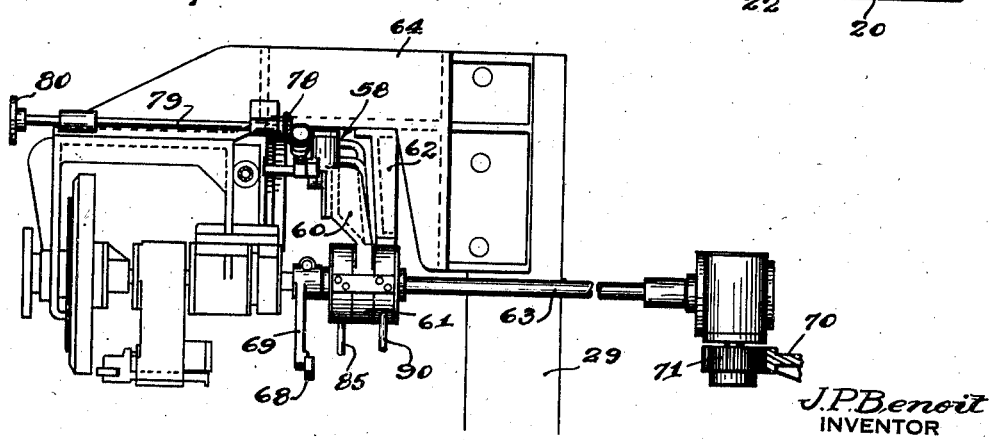

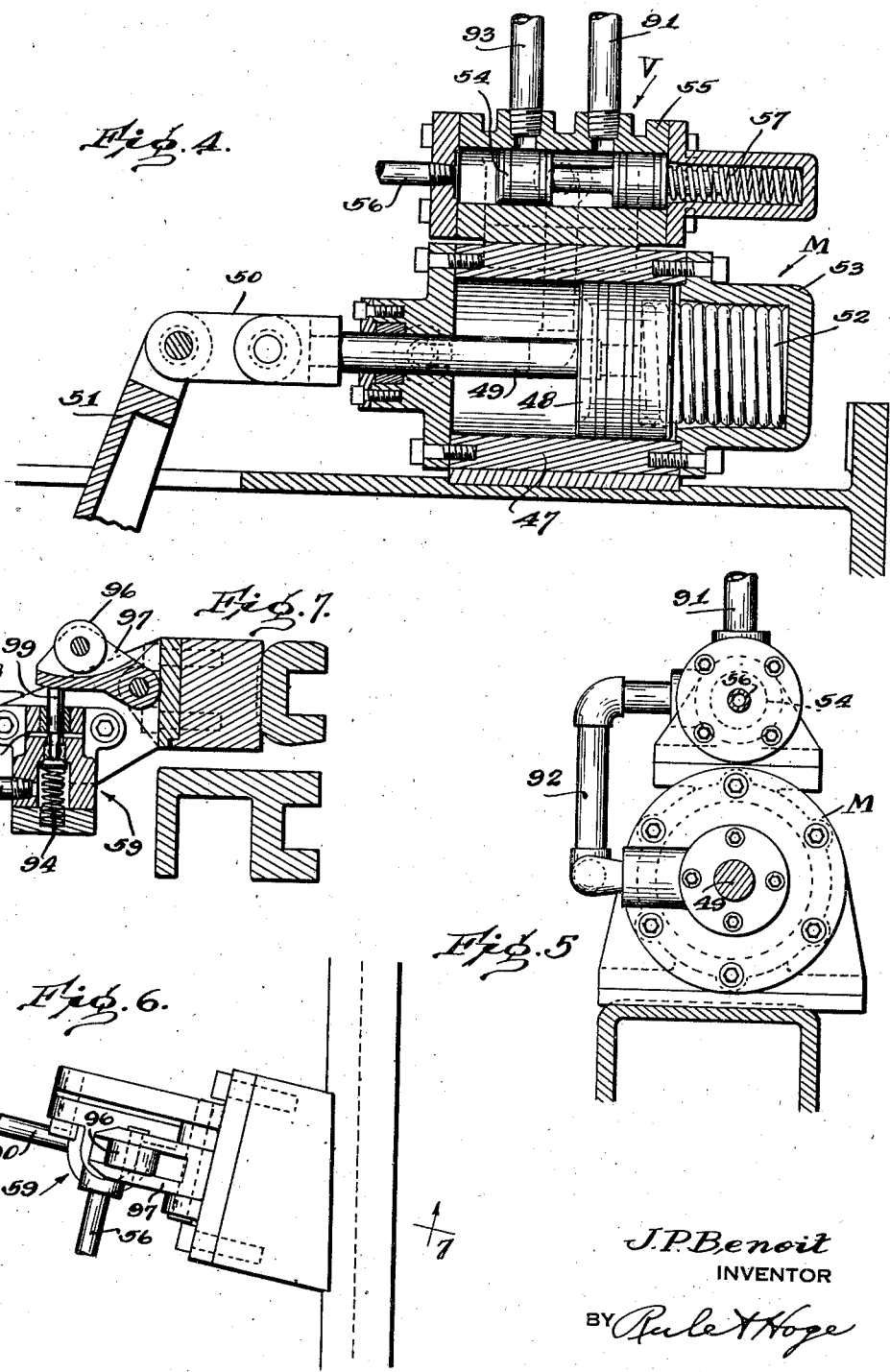

June 2, 1942.  J. P. BENOIT  2,285,325
KNIFE OPERATING MECHANISM FOR GLASS BLOWING MACHINES
Filed Nov. 27, 1940  5 Sheets-Sheet 4
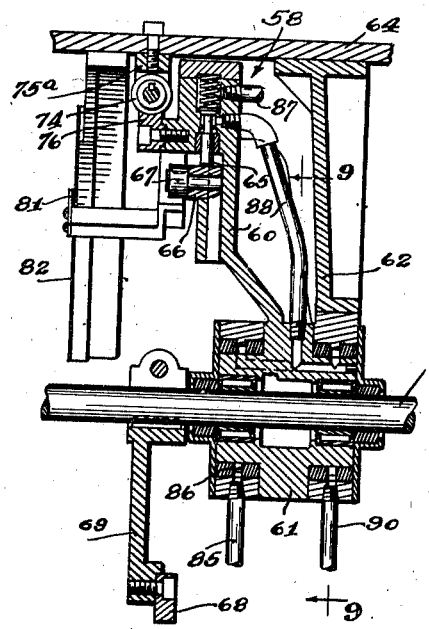
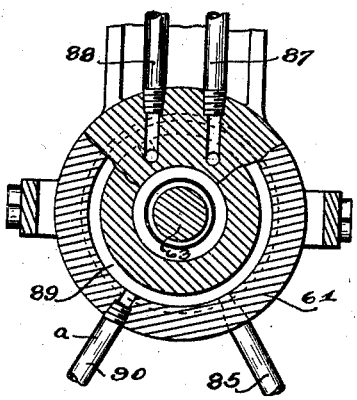
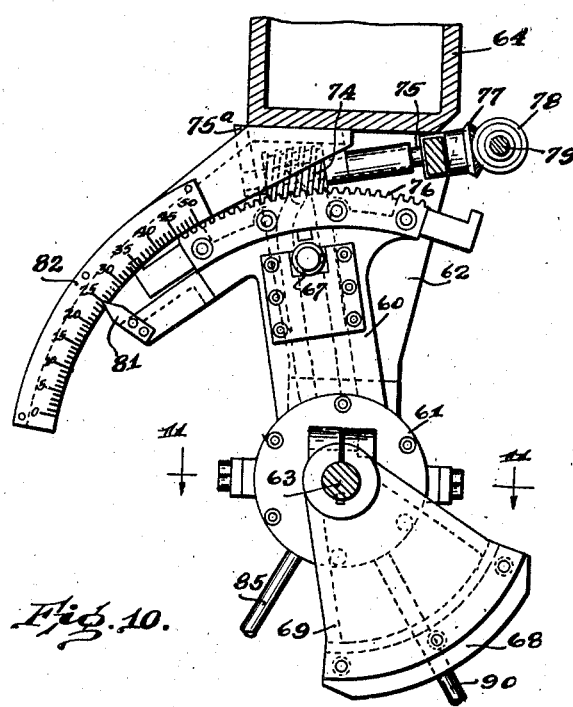
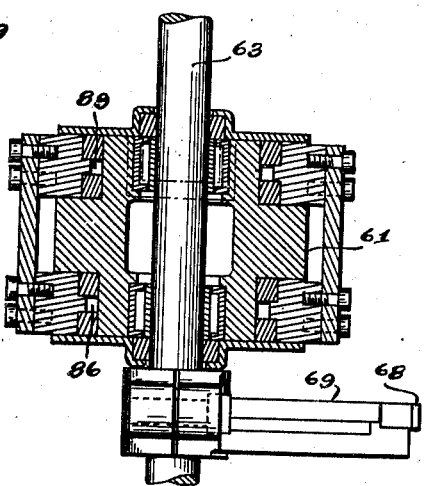
J. P. Benoit
INVENTOR
BY Rule & Hoge
ATTORNEYS June 2, 1942.  J. P. BENOIT  2,285,325
KNIFE OPERATING MECHANISM FOR GLASS BLOWING MACHINES
Filed Nov. 27, 1940  5 Sheets—Sheet 5
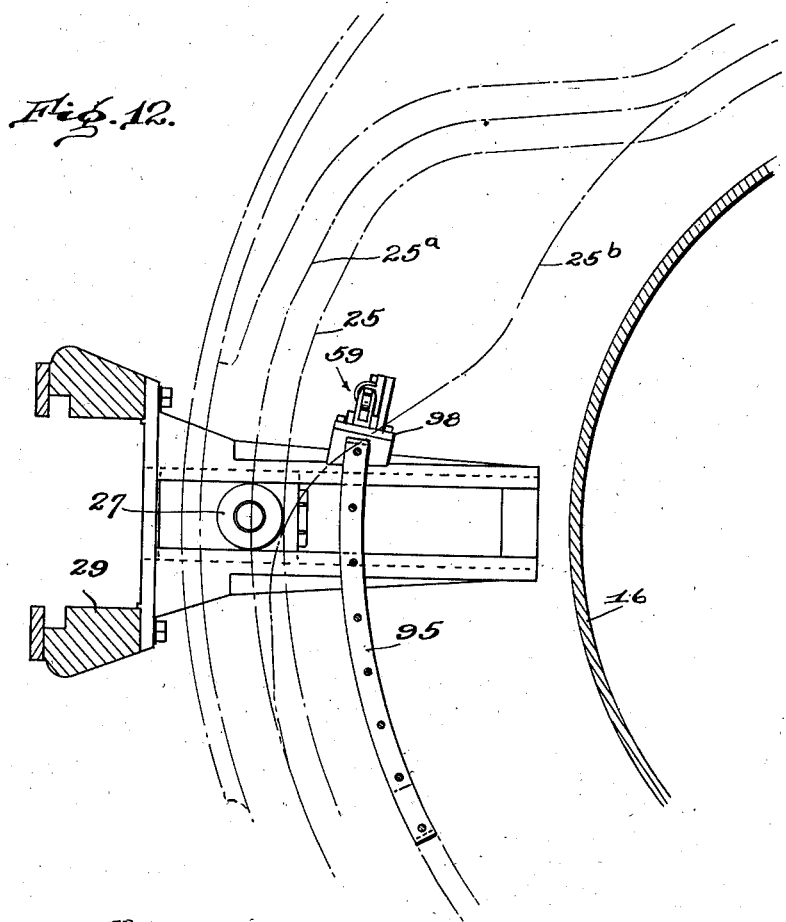
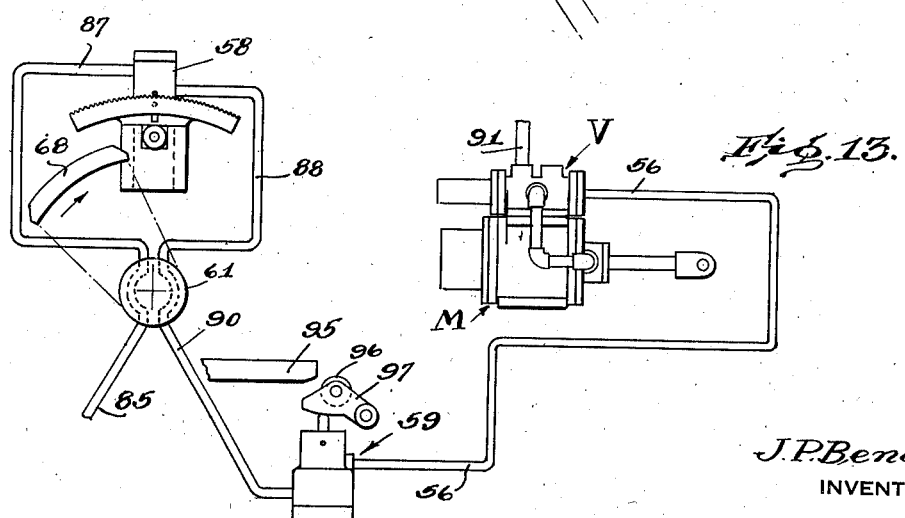
J. P. Benoit
INVENTOR
BY *Rule & Hoge*
ATTORNEYS Patented June 2, 1942

2,285,325

UNITED STATES PATENT OFFICE 2,285,325

KNIFE OPERATING MECHANISM FOR GLASS BLOWING MACHINES

Joseph P. Benoit, Alton, Ill., assignor to Owens-Illinois Glass Company, a corporation of Ohio Application November 27, 1940, Serial No. 367,445

10 Claims. (Cl. 49—14)

My invention relates to machines of the suction gathering type for blowing bottles, jars and other articles, and particularly to machines of the type in which the gathering molds are lowered in succession into contact with a pool of molten glass, a charge of glass drawn by suction into each mold through the lower, open end thereof, the mold lifted and the glass therein severed from the supply body by a knife which swings across the mouth of the mold. In machines of this character, such as the Owens suction type machines, the knife blade is carried on a vertically disposed rock shaft which is rocked for swinging the knife across the bottom of the mold to sever the glass and close the lower end of the mold cavity. The knife is held momentarily in such position and the knife shaft is then moved downward to drop the knife away from the mold before the mold is opened by swinging the mold sections apart.

In machines of the character above indicated the knife is under the control of a stationary cam operating through suitable linkage to lift and lower the knife as it rotates with the mold carriage. Such machines usually comprise an annular series of heads or units on a horizontally rotating carriage, each unit including a gathering mold, cut-off knife and other mechanism cooperating with the mold, all of the cut-off mechanisms being actuated by the same stationary cam.

An object of the present invention is to provide automatic means individual to the mold units by which each cut-off knife is dropped at a predetermined time and place during its rotation, independent of the time and place at which the knives on the other mold units are dropped.

A further object of the invention is to provide novel adjusting means by which the time of the knife drop movement of each knife relative to the opening of the associated mold may be adjusted independently of the other knife mechanisms.

A further object of the invention is to provide pneumatically operated means for controlling the knife drop movements.

A further object of the invention is to provide safety mechanism for insuring the lowering of the knife prior to the opening of the mold and thereby preventing interference between the mold and knife mechanisms.

Other objects of the invention will appear hereinafter.

Referring to the accompanying drawings which illustrate a preferred form of the invention as applied to a conventional glass blowing machine of the Owens suction gathering type:

Fig. 2 is a part-sectional side elevation of the same, some parts being shown more or less diagrammatically.

Fig. 3 is an elevation view showing a valve and its operating mechanism for controlling the knife drop.

Fig. 4 is a view on a larger scale showing the piston motor for dropping the knife.

Fig. 5 is an end elevation of the same.

Fig. 6 is a plan view of a by-pass valve and its operating means.

Fig. 7 is a sectional elevation of the same at the line 7—7 on Fig. 6.

Fig. 8 is a fragmentary sectional elevation of the valve and its operating mechanism shown in Fig. 3 but on a larger scale.

Fig. 9 is a section at the line 9—9 on Fig. 8 showing an adjustable distributing head.

Fig. 10 is an elevation of the mechanism shown in Fig. 8.

Fig. 11 is a section at the line 11—11 on Fig. 10.

Fig. 12 is a fragmentary sectional plan view showing the guideways for the dip head, the by-pass valve and its operating cam, and mechanism including a stationary cam, shown diagrammatically, controlling the opening and closing of the molds.

Fig. 13 is a diagrammatic view of the pneumatic operating and controlling mechanism.

Figure 1:
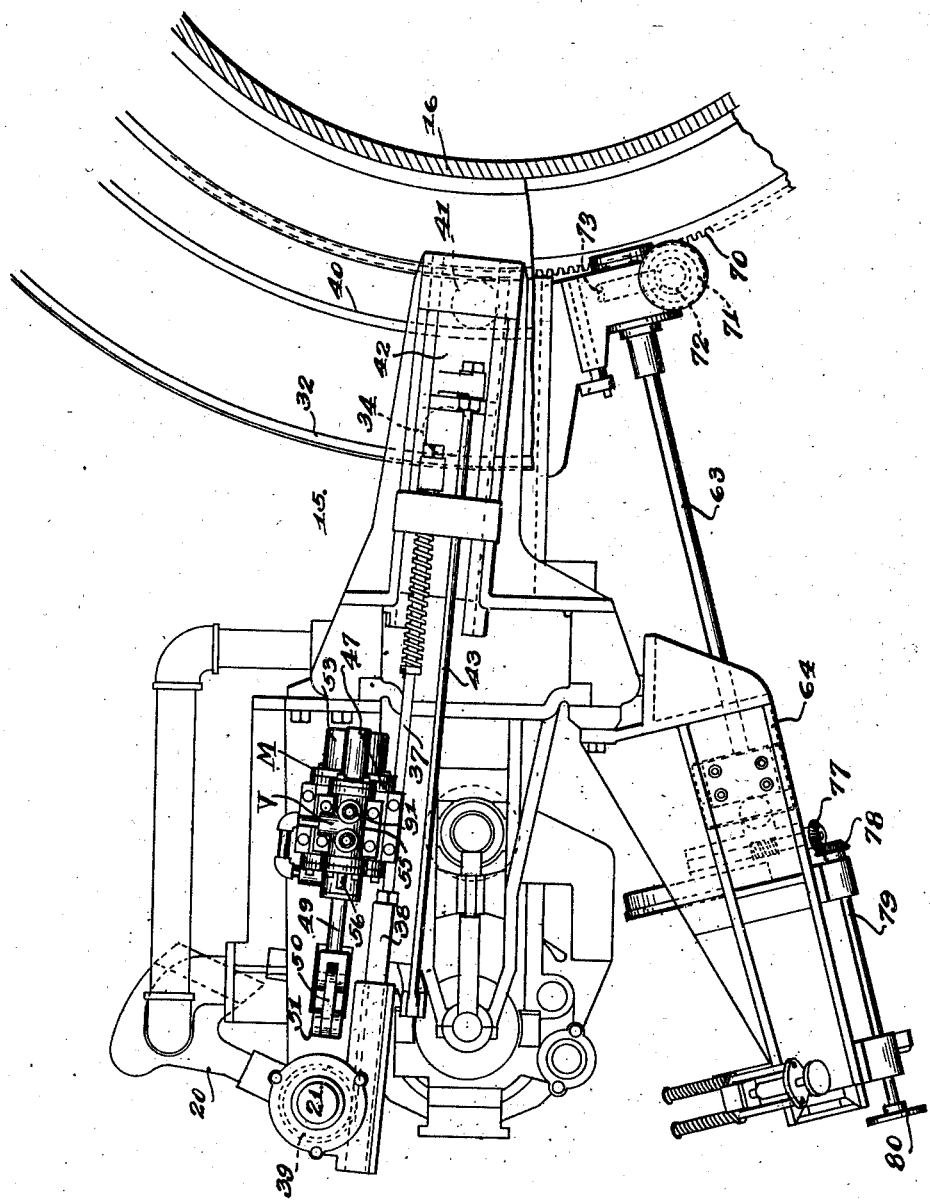
Fig. 1 is a part-sectional plan view showing particularly one head or unit of the machine.

The machine comprises a mold carriage 15 mounted for continuous rotation about the vertical axis of a stationary column 16. An annular series of heads or units 17 is mounted for rotation with the carriage. Each said unit includes a suction gathering mold 18, a dip head 19 on which the mold is carried, means for lowering and lifting the dip head, thereby lowering the mold into contact with a pool of molten glass for sealing the lower end of the mold cavity, means for exhausting the air from the mold and thereby gathering a charge of glass by suction, a knife 20 carried on a vertical rock shaft 21, means for rocking the shaft, thereby causing the knife blade 22 to shear across the bottom of the mold, after the latter is lifted from the pool, for severing the glass. The parison mold 18 may consist of a body blank mold and a neck mold 23 above and in register therewith, the blank mold and neck mold each comprising horizontally separable sections mounted to swing about a vertical pivot 24 for opening and closing the mold sections. The opening and closing movements of the mold sections are controlled by a stationary cam 25 on the under side of a cam plate 26. The cam 25 is adjustable rotatively of the mold carriage for adjustably varying the point at which it operates to open the mold. A cam roll 27 running on the cam 25 is operatively connected to the mold in a conventional manner through suitable linkage including the arms 28 which carry the mold sections, for swinging the latter about the pivot 24.

Referring to Fig. 12 the cam 25 may be adjusted rotatively of the mold carriage to bring the center line thereof from the position 25<sup>a</sup> to the position 25<sup>b</sup> or any intermediate position. This permits the blank mold to be opened at any predetermined length of time after the charge has been gathered as required to permit the desired cooling of the blank, such length of time being variable with different molds and other variable operating conditions.

The dip frame is mounted for up and down movements in guideways formed in vertical guide posts 29. These movements are under the control of a cam track 30 on which runs a cam roll 31 connected through suitable linkage to the dip head for effecting such movements.

The knife shaft 21 is rocked by means of a stationary cam track 32 formed on a cam plate 33. A cam roll 34 running on the track 32 is attached to a slide block 35 mounted to reciprocate radially of the mold carriage in guideways 36. A rod 37 extending radially of the machine is connected at its inner end to the slide block 35 and at its outer end is attached to a rack bar 38 which drives a gear 39 keyed on the knife shaft 21.

The knife shaft 21 is lifted by means of a stationary cam 40 on the cam plate 33. A cam roll 41 running on the cam track is carried on a slide block 42 slidable in the guides 36. A connecting rod 43 extending radially of the mold carriage is connected at its inner end to the slide block 42 and at its outer end is pivoted to a rock arm 44 fixed to and extending upward from a rock shaft 45 mounted on the dip head. A horizontally disposed rock arm 46 also fixed to the rock shaft 45 is connected at its outer end to the knife shaft. When the knife lifting cam 40 operates to move the cam roll 41 radially inward, the movement is transmitted through the linkage just described to lift the knife so that when the knife shaft is rocked, the blade shears across the bottom of the mold.

The parts above described may be conventional and are standard mechanism on Owens type machines. The present invention relates particularly to the knife drop mechanism and cooperating parts as will now be described.

The lowering or drop movement of the knife is under the control of a pneumatic piston motor M (Figs. 1, 2, 4 and 5) including a cylinder 47, a piston 48 and a piston rod 49. A link 50 connects the piston rod to a rock arm 51 which rocks the shaft 45, said arm 51 being fixed to the rock arm 46. The piston 48 is moved in one direction by means of a coil spring 52 held under compression in a cap or housing 53 bolted to the cylinder 47. The piston is moved in the opposite direction against the force of the spring by air or other fluid under pressure, under the control of a valve V comprising a valve piston 54 mounted to reciprocate in a valve casing 55. The valve piston is moved to the right as shown in Fig. 4 by air pressure supplied through a pressure pipe 56 and moved in the opposite direction by a spring 57 when the pressure supply through the pipe 56 is cut off.

As indicated in Fig. 13 the air pressure supplied through the pipe 56 for actuating the motor control valve V is under the control of two separate valves, namely, a valve 58 and a by-pass valve 59. Normally the valve 58 controls the operation of the pneumatic motor while the by-pass valve 59 (shown in detail in Figs. 2, 6, 7 and 12) serves as a safety means as hereinafter set forth. The valve 58 is mounted on a vertically disposed arm 60 (Figs. 8 and 10) which is formed integral with a cylindrical head 61 supported in a bracket 62 and rotatively adjustable therein about the axis of a shaft 63 which extends through the head 61 and is journalled for rotation therein. The bracket 62 is attached to the under surface of a horizontally disposed bracket arm 64 (Fig. 1) bolted to the head 15 for rotation with the mold carriage.

The valve 58 (Fig. 8) includes a valve stem 65 which is moved upward for opening the valve by means of a slide 66 mounted for up and down movement in guideways on the arm 60. The slide carries a cam roll 67 which is periodically actuated by a segmental cam 68 mounted on an arm 69 keyed to the shaft 63. The shaft 63 is rotated continuously, making one complete rotation during each rotation of the mold carriage about its axis so that the valve 58 is actuated at a predetermined point during each rotation of the mold carriage. The means for rotating the shaft 63 includes a stationary ring gear 70 (Figs. 1, 2 and 3) on the column 16 and which drives a gear pinion 71 on a worm shaft 72. A worm on the shaft 72 drives a worm wheel 73 keyed to the shaft 63.

The means for adjusting the arm 60 which carries the valve 58 and thereby adjustably varying the time at which the valve is operated, is as follows: A spiral gear 74 (Figs. 8 and 10) is carried on a shaft 75 journalled in a bracket 75<sup>a</sup> secured to the arm 64 and meshes with a segmental rack 76 fixed to the arm 60. Bevel gears 77 and 78 provide a driving connection between the shaft 75 and a shaft 79, the latter mounted on the arm 64 (Fig. 1) and provided with a hand wheel 80. Rotation of the hand wheel operates through the gearing just described to rock the arm 60 about the axis of the shaft 63, carrying with it the valve and cam roll 67, thereby adjustably varying the time at which the valve is operated by its cam 68. A pointer 81 carried on the arm 60, moves over a graduated scale 82 and indicates the position to which the valve is adjusted and thus the time at which the valve will be opened to effect the knife drop controlled thereby.

After the mold 18 has gathered its charge of glass and has been lifted out of dip and after the knife has been lifted by its cam 40 (Fig. 2), the cam 32 operates to rock the knife shaft, thereby causing the knife to sever the glass and close the mold cavity. While the knife is in this position the segmental cam 68 operates to open the valve 58 (Fig. 8) for supplying air under pressure to the motor control valve V. The air pressure line extending through the valve 58 includes a pressure supply pipe 85 (Figs. 8, 9, 13) extending to the drum 61, annular port 86 in said drum, pipe 87 extending from the drum to the valve, return pipe 88 from the valve to the drum, annular port 89 in the drum, pipe 90 leading from the drum to the valve 59, and pipe 56 to motor valve V.

When the segmental cam opens the valve 58, air pressure is supplied through the pressure line just traced to the valve V and moves the valve piston 54 to the right as shown in Fig. 4. This admits air under pressure to the motor through a pressure supply pipe 91 and pipe 92 extending to the left-hand end of the motor cylinder, thereby moving the motor piston to the right as shown in Fig. 4. The motor M now serves to hold the knife in its lifted position independently of the lifting cam 40 and after the cam roll 41 passes beyond the control of its cam. When the segmental cam 68 runs off the valve 58, the valve stem 65 is lowered, thereby closing the valve and opening the pressure line to the exhaust so that the motor valve piston 54 (Fig. 4) is reversed. This cuts off the pressure supply to the motor and opens the motor cylinder to an exhaust pipe 93. The motor spring 52 then moves the motor piston to the left and thereby drops the knife 20 away from the mold.

The by-pass valve 59 (Figs. 2, 6, 7, 12 and 13) and its operation will now be described. The valve, as shown in Fig. 12, is mounted to rotate with the mold carriage and is held closed during the major portion of its rotation by a coil spring 94 (Fig. 7) but is opened by means of a stationary arcuate cam 95 (Figs. 2 and 12) mounted on the under side of the cam plate 26. A cam roll 96 carried on a rock arm 97 pivoted to a bracket 98 on which the valve 59 is mounted, is actuated by the cam 95 for depressing the valve stem 99 and thereby opening the valve. This establishes communication between the pipes 90 and 56.

The cam 95 is so located that it opens the by-pass valve 59 before the valve 58 is opened and normally holds the by-pass valve open until after the valve 58 is closed, thereby preventing interference with the normal functioning of the valve 58. However, it is possible to adjust the cam 25 to a position for effecting an early opening of the mold and also to adjust the segmental cam 68 to cause a comparatively late operation of the valve 58 for controlling the knife drop, so that the latter valve will not be closed until after the mold has opened. This would cause interference between the mold and knife operating mechanism. But such interference is prevented by the closing of the by-pass valve which always takes place before the mold opens. Such closing of the valve 59 cuts off the air pressure supply to the motor valve V and opens the pipe 56 to atmosphere through a vent 100 (Fig. 7), thereby causing the motor M to operate and drop the knife. It will be noted that the cam 95 is attached to and adjustable with the mold opening cam 25 (Fig. 2) so that there is a constant time interval between the closing of the by-pass valve 59 and the opening of the mold, regardless of such cam adjustments.

Modifications may be resorted to within the spirit and scope of my invention.

I claim:

1. A glass molding machine comprising in combination a mold carriage rotatable about a vertical axis, a mold mounted to rotate with the carriage, a knife shaft mounted on the carriage, a knife on said shaft, means for moving the shaft lengthwise and thereby moving the knife toward and from the mold, said means including a fluid operated motor and operating connections between the motor and said shaft, a motor control valve controlling a supply of fluid under pressure to the motor for operating it, a fluid pressure line extending to said valve for supplying fluid under pressure to operate the valve, a fluid control valve in said pressure line and mounted to rotate with the mold carriage, and automatic means for actuating the fluid control valve periodically when it reaches a predetermined position during its rotation and thereby effecting an operation of the motor and of the knife shaft at a predetermined point during the rotation of the mold carriage.

2. A glass molding machine comprising in combination a mold carriage rotatable about a vertical axis, a mold mounted to rotate with the carriage, a knife shaft mounted on the carriage, a knife on said shaft, means for moving the shaft lengthwise and thereby moving the knife toward and from the mold, said means including a fluid operated motor and operating connections between the motor and said shaft, a motor control valve controlling a supply of fluid under pressure to the motor for operating it, an air pressure line extending to said valve for supplying air under pressure to operate the valve, an air control valve in said pressure line and mounted to rotate with the mold carriage, a cam mounted to rotate with the mold carriage, automatic means for actuating said cam and causing it to operate said air control valve at a predetermined point during the rotation of the mold carriage, and adjusting means by which the time of operation of the air control valve is adjustably varied.

3. A glass molding machine comprising in combination a mold carriage rotatable about a vertical axis, a mold mounted to rotate with the carriage, a knife shaft mounted on the carriage, a knife on said shaft, means for moving the shaft lengthwise and thereby moving the knife toward and from the mold, said means including a fluid operated motor and operating connections between the motor and said shaft, a motor control valve controlling a supply of fluid under pressure to the motor for operating it, an air pressure line extending to said valve for supplying air under pressure to operate the valve, an air control valve in said pressure line and mounted to rotate with the mold carriage, a shaft mounted for rotation on the mold carriage, a cam connected to rotate with the shaft, and driving means for imparting a complete rotation to said shaft during each complete rotation of the mold carriage about its axis, said cam being arranged to operate the air control valve.

4. A glass molding machine comprising in combination a mold carriage rotatable about a vertical axis, a mold mounted to rotate with the carriage, a knife shaft mounted on the carriage, a knife on said shaft, means for moving the shaft lengthwise and thereby moving the knife toward and from the mold, said means including a fluid operated motor and operating connections between the motor and said shaft, a motor control valve controlling a supply of fluid under pressure to the motor for operating it, an air pressure line extending to said valve for supplying air under pressure to operate the valve, an air control valve in said pressure line and mounted to rotate with the mold carriage, a shaft mounted for rotation on the mold carriage, a cam connected to rotate with the shaft, driving means for imparting a complete rotation to said shaft during each complete rotation of the mold carriage about its axis, said cam being arranged to operate the air control valve, an arm on which said air control valve is mounted, and adjusting means for rotating said arm about the axis of said shaft and thereby adjusting the air valve relative to said cam.

5. A glass forming machine of the suction gathering type comprising a mold carriage rotatable about a vertical axis, a mold on the carriage, a knife shaft on the carriage, a fluid operated motor for actuating the knife shaft, a valve controlling the operation of the motor, a cam shaft mounted on the carriage, a cam on said shaft, automatic means for rotating said shaft and causing a complete rotation of the cam about the axis of said shaft during each complete rotation of the mold carriage, an arm on which said valve is mounted in position to be actuated by the cam, means for adjusting said arm about the axis of said cam shaft to adjust the time at which the valve is actuated, a pointer carried on said arm, and a graduated scale cooperating with said pointer to indicate the position to which said arm is adjusted.

6. A glass forming machine of the suction gathering type comprising a mold carriage rotatable about a vertical axis, a sectional mold mounted for rotation with the mold carriage, a stationary cam, operating means actuated by said cam for opening and closing the mold, a knife cooperating with the mold, knife drop mechanism for dropping the knife at a predetermined point during the rotation of the mold carriage and while the mold is closed, said mold opening means being adjustable to vary the point at which during the rotation of the mold carriage the mold is opened, and safety mechanism operable automatically to insure the drop of the knife prior to the opening of the mold.

7. A glass forming machine of the suction gathering type comprising a mold carriage rotatable about a vertical axis, a sectional mold mounted for rotation with the mold carriage, a stationary cam, operating means actuated by said cam for opening and closing the mold, a knife cooperating with the mold, knife drop mechanism for dropping the knife at a predetermined point during the rotation of the mold carriage and while the mold is closed, said mold opening means being adjustable to vary the point at which during the rotation of the mold carriage the mold is opened, and safety mechanism operable automatically to insure the drop of the knife prior to the opening of the mold, said knife drop mechanism including a fluid operated motor, a valve controlling the operation of said motor, means for actuating said valve when the mold reaches a predetermined point during the rotation of the mold carriage, and adjusting means for adjustably varying the point at which said valve is operated.

8. A glass molding machine of the automatic suction gathering type comprising a mold carriage rotatable horizontally, a mold mounted to rotate therewith, means for opening and closing the mold, a vertically disposed knife shaft, a knife carried thereby, means to rock said shaft and cause the knife to shear across the bottom of the mold while the latter is closed, automatic means for dropping the knife away from the mold before the latter is opened, said last mentioned means including a fluid operated motor, a motor control valve, an air pressure line leading to said valve for supplying air under pressure to operate the valve, an air control valve in said pressure line, means for periodically actuating said air control valve and thereby effecting an operation of the said motor for dropping the knife, and a safety valve controlling said air pressure line and operable independently of the said air control valve to insure dropping of the knife prior to the opening of the mold.

9. A glass molding machine of the automatic suction gathering type comprising a mold carriage rotatable horizontally, a mold mounted to rotate therewith, means for opening and closing the mold, a vertically disposed knife shaft, a knife carried thereby, means to rock said shaft and cause the knife to shear across the bottom of the mold while the latter is closed, automatic means for dropping the knife away from the mold before the latter is opened, said last mentioned means including a fluid operated motor, a motor control valve, an air pressure line leading to said valve for supplying air under pressure to operate the valve, an air control valve in said pressure line, a cam for operating the air control valve at a predetermined time during the rotation of the mold carriage and thereby causing the knife to be dropped at a predetermined point, adjusting means for adjustably varying the time at which the air control valve is operated during rotation of the mold carriage, said mold opening and closing means being adjustable to vary the time at which the mold is opened, a safety valve in said air pressure line, and means for actuating the safety valve, said last mentioned means being adjustable with the means for adjusting the time of opening of the mold and insuring the operation of the safety valve at a predetermined time prior to the opening of the mold, said safety valve operable independently of said air pressure control valve to insure the dropping of the knife before the mold opens.

10. A glass molding machine comprising in combination a rotatable mold carriage, a mold mounted to rotate therewith, a knife mounted to rotate with the carriage, a stationary cam, mechanism mounted to rotate with the carriage and operated by the cam for moving the knife in one direction, a fluid operated motor mounted to rotate with the carriage and operatively connected with the knife for returning it by a movement in the opposite direction, a valve controlling the operation of said motor, a second cam, means providing operating connections between said second cam and the valve for actuating the valve independently of the said stationary cam when the mold reaches a predetermined rotative position, and adjusting means for adjusting said second cam and thereby adjustably varying the time at which the motor operates to effect said return movement of the knife.

JOSEPH P. BENOIT.